US010027878B2

United States Patent
Nakano et al.

(10) Patent No.: US 10,027,878 B2
(45) Date of Patent: Jul. 17, 2018

(54) DETECTION OF OBJECT IN DIGITAL IMAGE

(71) Applicant: CASIO COMPUTER CO., LTD., Tokyo (JP)

(72) Inventors: Kanako Nakano, Tokyo (JP); Jun Muraki, Tokyo (JP); Shohei Sakamoto, Tokyo (JP); Hideaki Matsuda, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 259 days.

(21) Appl. No.: 14/826,370

(22) Filed: Aug. 14, 2015

(65) Prior Publication Data

US 2016/0073004 A1   Mar. 10, 2016

(30) Foreign Application Priority Data

Sep. 9, 2014   (JP) ................. 2014-183717

(51) Int. Cl.
*H04N 5/232* (2006.01)
*G06K 9/00* (2006.01)

(52) U.S. Cl.
CPC ..... *H04N 5/23212* (2013.01); *G06K 9/00624* (2013.01); *H04N 5/23219* (2013.01); *H04N 5/23293* (2013.01); *G06K 2209/17* (2013.01)

(58) Field of Classification Search
CPC .......... H04N 5/23212; H04N 5/23219; H04N 5/23293; G06F 3/167; G06K 9/00624; G06K 2209/17
See application file for complete search history.

(56) References Cited

U.S. PATENT DOCUMENTS 8,384,792 B2 * 2/2013 Ogawa ............... G06K 9/00248
                                                             348/222.1
9,098,533 B2 * 8/2015 Hammontree .... G06F 17/30864
(Continued)

FOREIGN PATENT DOCUMENTS

JP    H11-327030 A    11/1999
JP    2002-247436 A    8/2002
(Continued)

OTHER PUBLICATIONS

Japanese Office Action dated Apr. 26, 2016, in a counterpart Japanese patent application No. 2014-183717.
(Continued)

*Primary Examiner* — Luong T Nguyen
(74) *Attorney, Agent, or Firm* — Chen Yoshimura LLP

(57) ABSTRACT

A detection apparatus for detecting a subject in a digital image, including: an input and output interface to which a word for identifying the subject is input; and a processor configured to: receive the word for identifying the subject from the input and output interface; determine an attribute that is specified by the word for identifying the subject, the attribute being at least one of name, color, shape, size, and position; select a method of detection in accordance with the determined attribute; apply the selected method of detection to the digital image to detect the subject in the digital image; and output a result of the detection of the subject so as to cause a prescribed action to be performed with respect to the detected subject in the digital image.

25 Claims, 11 Drawing Sheets

(56) References Cited

U.S. PATENT DOCUMENTS

| | | | | |
|---|---|---|---|---|
| 2012/0075500 A1* | 3/2012 | Kaneda | ............ | H04N 5/23219 |
| | | | | 348/231.6 |
| 2014/0112530 A1* | 4/2014 | Yadani | ............... | G06K 9/00624 |
| | | | | 382/103 |
| 2015/0161997 A1* | 6/2015 | Wetsel | .................... | G06F 3/167 |
| | | | | 704/275 |

FOREIGN PATENT DOCUMENTS

| JP | 2008-277903 A | 11/2008 |
|---|---|---|
| JP | 2009-219144 A | 9/2009 |
| JP | 2010-85530 A | 4/2010 |
| JP | 2010-217613 A | 9/2010 |
| JP | 2011-35771 A | 2/2011 |
| JP | 2014-122978 A | 7/2014 |

OTHER PUBLICATIONS

Japanese Office Action dated Jan. 12, 2016, in a counterpart Japanese patent application No. 2014-183717.

* cited by examiner

| Name | Classification | Image | Color | Shape | Similar Objects | Related Terms |
|---|---|---|---|---|---|---|
| Watermelon | Fruit | Collated Image #1 | Green, Black | Round | Melon | Striped, Seed, Summer |
| Banana | Fruit | Collated Image #2 | Yellow | Long and Slender, Curved | — | Bunch |
| Tangerine | Fruit | Collated Image #3 | Orange | Round, Flat | Orange | Winter, Vitamins |
| Melon | Fruit | Collated Image #4 | Green | Round | Watermelon | Seed, Net, Expensive |
| Apple | Fruit | Collated Image #5 | Red, Green | Round | Peach | Seed, Smooth |
| Grape | Fruit | Collated Image #6 | Purple | Round | Strawberry | Seed, Bunch |
| ... | ... | ... | ... | ... | ... | ... |

| Classification | Attribute | | | | | |
| --- | --- | --- | --- | --- | --- | --- |
| Fruit | Image | Color | Shape | Similar Objects | Related Terms | |
| Building | Image | Shape | Color | Similar Objects | Related Terms | |
| Vehicle | Image | Shape | Color | Related Terms | Similar Objects | |
| ... | ... | ... | ... | ... | ... | |
| Order of Priority | 1 | 2 | 3 | 4 | 5 | |
| Baseline Value | 100 | 80 | 60 | 40 | 20 | |

DETECTION OF OBJECT IN DIGITAL IMAGE

BACKGROUND OF THE INVENTION

Technical Field

The present invention relates to detection of objects/features in digital images.

Background Art

Intelligent AF is a well-known type of AF (autofocus) technology. By analyzing captured images, intelligent AF technology attempts to identify a subject (focus subject) that a user desires to image. Once a possible subject has been identified, the intelligent AF then automatically focuses on that subject. According to intelligent AF, a focus subject can be imaged by a simple operation.

However, it is necessary for a user to perform an operation to shift the focus to the correct focus subject when the subject (focus subject) that the user desires to image and the subject that the intelligent AF identified to be the focus subject do not match.

In addition, after intelligent AF has focused on and imaged any one of a plurality of subjects included in a captured image, it is difficult for the user to shift the focus if the user wants to focus on and image another subject.

Another challenge with intelligent AF technology is that it is difficult, when imaging using a self-timer, to shift the focus after the self-timer has been activated.

To solve problems such as these, Japanese Patent Application Laid-Open Publication No. 2011-35771, for example, discloses an imaging apparatus configured so that the apparatus outputs sounds that respectively represent a plurality of subjects identified from an image and a user can choose a focus subject in accordance with the output sounds.

SUMMARY OF THE INVENTION

Accordingly, the present invention is directed to a detection apparatus and method that substantially obviate one or more of the problems due to limitations and disadvantages of the related art.

An object of the present invention is to provide an improved method for executing intelligent autofocus in a display apparatus.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a detection apparatus for detecting a subject in a digital image, including: an input and output interface to which a word for identifying the subject is input; and a processor configured to: receive the word for identifying the subject from the input and output interface; determine an attribute that is specified by the word for identifying the subject, the attribute being at least one of name, color, shape, size, and position; select a method of detection in accordance with the determined attribute; apply the selected method of detection to the digital image to detect the subject in the digital image; and output a result of the detection of the subject so as to cause a prescribed action to be performed with respect to the detected subject in the digital image.

In another aspect, the present disclosure provides a detection apparatus for detecting a subject in a digital image, including: an input and output interface configured to receive a sound for identifying the subject; and a processor connected to the input and output interface, wherein one of the input and output interface and the processor converts the received sound into a word for identifying the subject, and wherein the processor is further configured to: extract a specific characteristic that specifies an attribute that is at least one of color, shape, size, and position from the word converted by the one of the input and output interface and the processor when the word includes the specific characteristic; determine, from the digital image, the subject that has a characteristic that substantially matches the specific characteristic extracted from the word; and output a result of the determination of the subject so as to cause a prescribed action to be performed with respect to the determined subject in the digital image.

In another aspect, the present disclosure provides a method of detecting a subject in a digital image performed by a processor in an apparatus that includes, in addition to said processor, an input and output interface to which a word for identifying the subject is input, the method, the method including: receiving the word for identifying the subject from the input and output interface; determining an attribute that is specified by the word for identifying the subject, the attribute being at least one of name, color, shape, size, and position; selecting a method of detection in accordance with the determined attribute; applying the selected method of detection to the digital image to detect the subject in the digital image; and outputting a result of the detection of the subject so as to cause a prescribed action to be performed with respect to the detected subject in the digital image.

In another aspect. The present disclosure provides a method for detecting a subject in a digital image, performed by an apparatus that includes a processor and an input and output interface, the input and output interface being configured to receive a sound for identifying the subject, the method including: converting the received sound into a word for identifying the subject; extracting a specific characteristic that specifies an attribute that is at least one of color, shape, size, and position from said word when the word includes the specific characteristic; determining, from the digital image, the subject that has a characteristic that substantially matches the specific characteristic extracted from the word; and outputting a result of the determination of the subject so as to cause a prescribed action to be performed with respect to the determined subject in the digital image.

In another aspect, the present disclosure provides a computer readable non-transitory storage medium having instructions stored therein, the instructions causing a processor in an apparatus that includes, in addition to the processor, an input and output interface to which a word for identifying a subject in a digital image is input to perform the following: receiving the word for identifying the subject from the input and output interface; determining an attribute that is specified by the word for identifying the subject, the attribute being at least one of name, color, shape, size, and position; selecting a method of detection in accordance with the determined attribute; applying the selected method of detection to the digital image to detect the subject in the digital image; and outputting a result of the detection of the subject so as to cause a prescribed action to be performed with respect to the detected subject in the digital image.

In another aspect, the present disclosure provides a computer readable non-transitory storage medium having instructions stored therein for an apparatus that includes a processor and an input and output interface for detecting a subject in a digital image, the input and output interface being configured to receive a sound for identifying the subject, the instructions causing the apparatus to perform the following: converting the received sound into a word for identifying the subject; extracting a specific characteristic that specifies an attribute that is at least one of color, shape, size, and position from said word when the word includes the specific characteristic; determining, from the digital image, the subject that has a characteristic that substantially matches the specific characteristic extracted from the word; and outputting a result of the determination of the subject so as to cause a prescribed action to be performed with respect to the determined subject in the digital image.

It is to be understood that both the foregoing general description and the following detailed description are exemplary and explanatory, and are intended to provide further explanation of the invention as claimed.

BRIEF DESCRIPTION OF THE DRAWINGS

A deeper understanding of the present invention can be obtained by referring to both the drawings described below and the detailed descriptions provided later.

FIG. 4A shows an example configuration of a characteristic information table.

FIG. 4B shows an example configuration of a detection priority table.

DETAILED DESCRIPTION OF EMBODIMENTS

Figure 1:
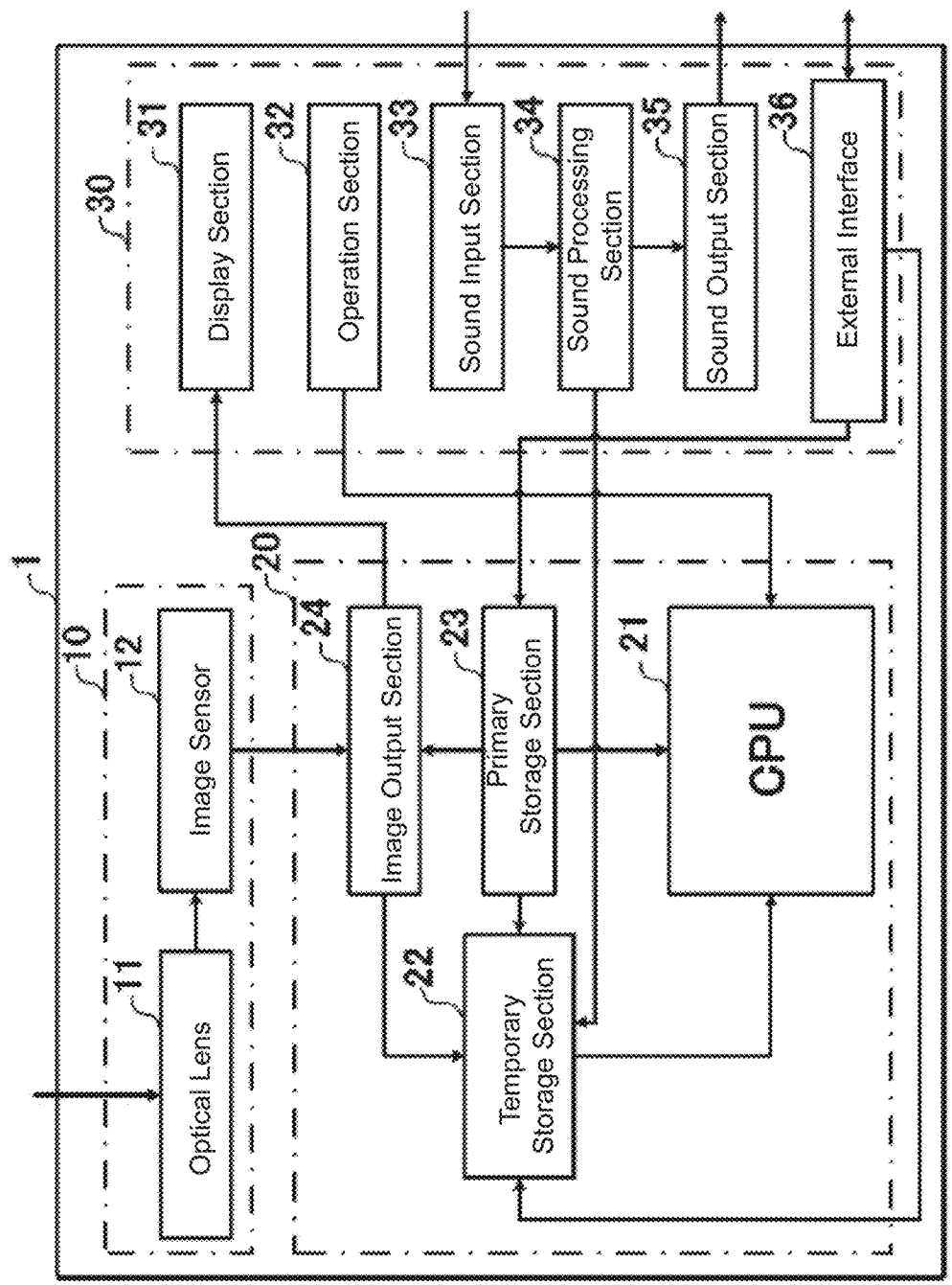
FIG. 1 is a block diagram that illustrates a hardware configuration of a detection apparatus according to an embodiment.

A detection apparatus and a method of detection according to embodiments of the present invention will be described hereafter in further detail with reference to the drawings. Identical and equivalent parts will have the same reference character.

A detection apparatus according to the present embodiment is configured as shown in FIG. 1. The detection apparatus 1 includes: an image section 10, a processing section 20, and an interface 30.

The image section 10 generates a captured image (a live view image or a through-the-lens image) in which a subject was imaged. The image is generated by following a user operation that was received by an operation section 32 (which will be explained later) and then imaging the subject.

The imaging section 10 includes an optical lens 11 and an image sensor 12.

The optical lens 11 includes a lens that focuses light coming from the direction of the subject, and a peripheral circuit for adjusting the setting parameters for imaging, such as focal length, exposure, and white balance.

The image sensor 12 includes a CCD (charge-coupled device), a CMOS (complementary metal oxide semiconductor), or the like, for example. The image sensor 12 acquires an optical image of the subject that was formed by the optical lens 11 focusing light, and converts the voltage information of the acquired optical image to digital image data via an analog/digital converter (not shown). The image sensor 12 then outputs the acquired digital image data to an image output section 24.

The processing section 20 performs detection processing, which will be explained later, on the captured image generated by the image section 10. The processing section 20 also realizes various functions of the detection apparatus 1 by executing various types of programs.

The processing section 20 includes: a CPU (central processing unit) 21, a temporary storage section 22, a primary storage section 23, and the image output section 24.

The CPU 21 controls the entire detection apparatus 1 by executing control programs stored in the primary storage section 23. The CPU 21 also realizes various types of functions of the detection apparatus 1 by executing various types of programs, including contour detection programs and morphological analysis programs, stored in the primary storage section 23.

The temporary storage section 22 includes RAM (random access memory) or the like, for example. The temporary storage section 22 functions as a working memory for the CPU 21, and temporarily stores: various types of image data, including live view images generated by the image section 10; sound data provided by a sound processing section 34; programs; and the like.

The main storage section 23 includes non-volatile memory (flash memory and/or a hard drive, for example) and permanently stores various types of programs, including control programs necessary for controlling the entire detection apparatus 1 and morphological analysis programs, and various types of permanent data, such as collated image data, and the like. The primary storage section 23 provides stored programs and data to the CPU 21 and the image output section 24.

The image output section 24 generates a live view image by performing prescribed processing (processing that lowers resolution, for example) on image data which was imaged by the image section 10. The image output section 24 provides images captured by the image section 10 to the temporary storage section 22 and causes the images to be stored there, and provides generated live view images to a display section 31 (which will be explained later) and causes the display section 31 to display the live view images.

The image output section 24 also reads image data stored in the temporary storage section 21 and the primary storage section 23, generates an RGB (R=red, G=green, and B=blue) signal corresponding to the image data, and outputs the signal to the display section 31, which will be explained later.

The interface 30, along with receiving external operational input and image and sound data input, externally outputs sound data and image data.

The interface 30 includes the display section 31, the operation section 32, a sound input section 33, the sound processing section 34, a sound output section 35, and an external interface 36.

The display section 31 includes a LCD (liquid crystal display), CRT (cathode ray tube), organic EL (electroluminescent) display, or the like, for example, and displays various types of images including live view images in accordance with image data provided by the image output section 24.

The operation section 32 receives operational input performed by the user. The operation section 32 includes a keyboard and various types of operation buttons, such as a shutter button, a cancel button, and a mode selection button for selecting the operation mode of the detection apparatus 1. The operation section 32 provides received operational input to the image section 10, the CPU 21, and the like.

The display section 31 and the operation section 32 may be configured so as to be superimposed on each other to form a so-called "touch panel."

The sound input section 33 includes a microphone, and receives input of analog sound signals, including the voice of the user, from outside the detection apparatus 1. The imported analog sound signals are delivered to the sound processing section 34.

The sound processing section 34 converts the analog sound signals provided by the sound input section 33 into digital sound signals, and provides the digital sound signals to the temporary storage section 22. The sound processing section 34 also reads the digital sound signals stored in the temporary storage section 22 and the primary storage section 23, converts the digital sound signals into analog sound signals, and transmits the analog sound signals to the sound output section 35.

The sound output section 35 includes a speaker, headphones, and/or the like, and outputs the analog sound signal provided by the sound processing section 34 to the outside of the detection apparatus 1.

The external interface 36 is an interface for exchanging data with devices that are external to the detection apparatus 1. The external interface 36 converts captured image data into USB (universal serial bus) standard data, and transmits data to and receives data from external devices via a USB cable, for example.

Figure 2:
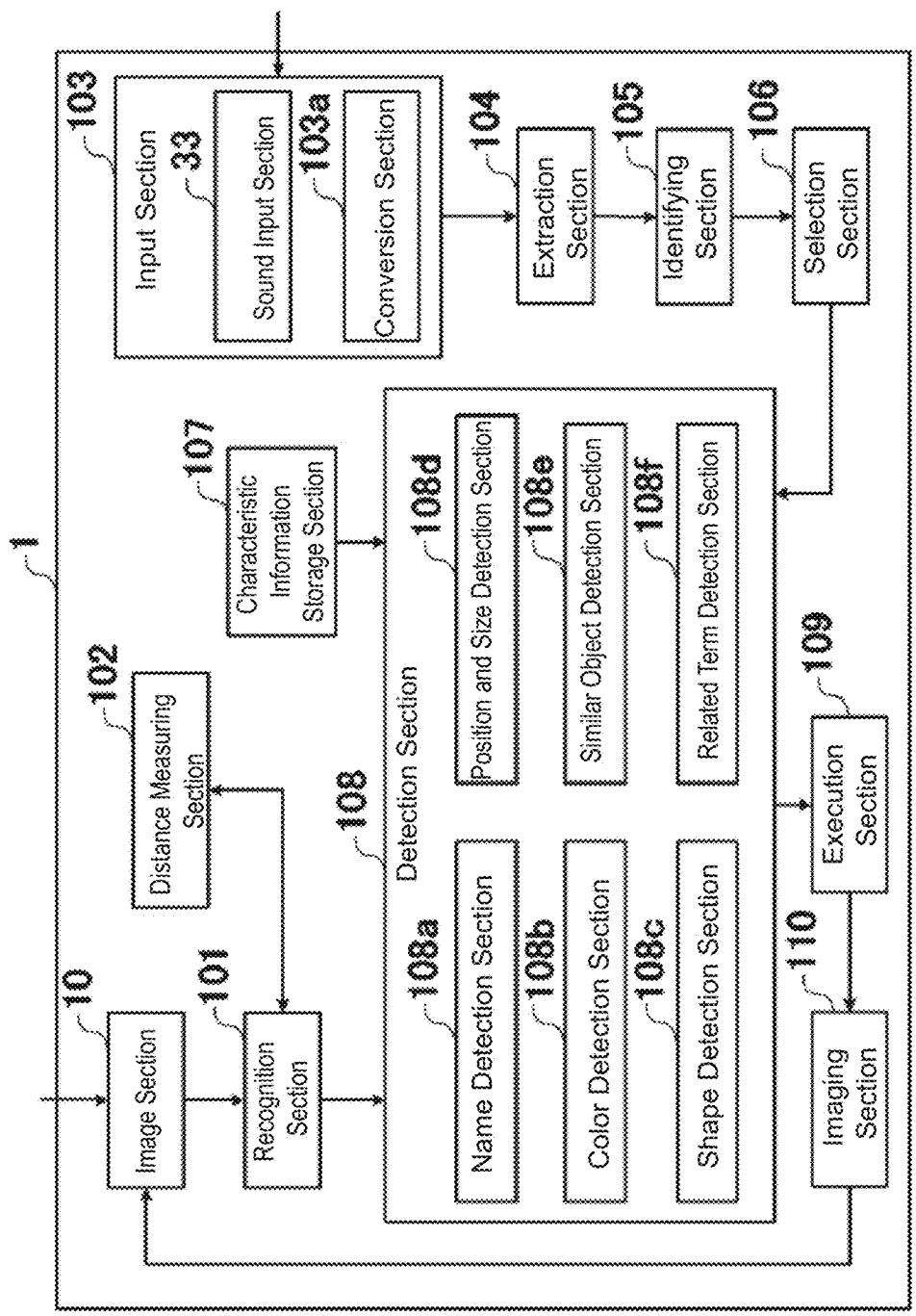
FIG. 2 is a block diagram that illustrates a functional configuration of a detection apparatus according to an embodiment.

The detection apparatus 1 is functionally configured as shown in FIG. 2. The detection apparatus 1 includes: a recognition section 101, a distance measuring section 102, an input section 103, an extraction section 104, an identifying section 105, a selection section 106, a characteristic information storage section 107, a detection section 108, an execution section 109, and an imaging section 110.

The detection apparatus 1 has, similar to a normal camera, a function that detects closed eyes, a person detection function, and the like, but will hereafter be explained in the present embodiment with a focus on the characteristic function of detecting from a captured image a subject that was specified by a word verbally input by a user.

The recognition section 101 sets a captured image generated by the image section 10 as a target image, and recognizes at least one object OB (which is a candidate for the subject) contained in the target image by performing object, color, and facial recognition processing on the target image. The target image is an image on which the detection apparatus 1 executes detection processing.

The target image is an image that includes various objects imaged by the image section 10. For example, target images TGa to TGe (hereafter collectively referred to as a target image TG) shown in FIGS. 8 to 12, which will be explained later, contain objects OB1a to OB4a, Ob1b to OB3b, OB1c to OB3c, OB1d to OB9d, and OB1e (hereafter collectively referred to as an object OB).

The recognition section 101 recognizes the unidentified object OB, which is a candidate for the subject, contained in the target image TG in accordance with characteristics related to a plurality of attributes, such as color and shape.

Specifically, the recognition section 101 recognizes the object OB contained in the target image TG by using a well-known technique to analyze the color distribution, shape (contour and pattern, for example), and the like of the target image TG. The recognition section 101 then acquires the size and the position of the recognized object OB by acquiring information indicating the area of the recognized object OB and the position of the recognized object OB in the width direction of the target image TG. Furthermore, the recognition section 101 uses an arbitrary well-known technique related to facial recognition to recognize a facial image region (an image region representing the face of a human subject) from the target image TG.

In this way, the recognition section 101 acquires information regarding the color, shape, size, and position (including the width direction and the depth direction) within the target image TG of the object OB, and information on whether or not the object OB is the face of a person.

The recognition section 101 is realized by the CPU 21.

The distance measuring section 102 measures the distance to the object OB recognized by the recognition section 101, and generates information indicating the measured distance. The recognition section 101 then acquires, in accordance with this generated information that indicates distance, information that indicates the position of the recognized object OB in the depth direction of the target image TG.

The distance measuring section 102 is realized via a combination of the above-mentioned CPU 21 and the above-mentioned image section 10. Specifically, in accordance with the control implemented by the CPU 21, the image section 10 changes the focal position of the image section 10, and acquires the distance to the object OB in accordance with the focal position when the object OB was in focus.

The input section 103 receives an input of words that specifies the subject. More specifically, the input section 103 includes a sound input section 33 that receives an input of sound (a sound signal), and a conversion section 103a that acquires words specifying the subject by converting into words the sound input via the sound input section 33.

Here, the words (keywords, key phrases, and reference terms) specifying the detection subject are pieces of information that specify the subject that the user wishes to have detected (the subject or focus subject that the user wishes to image). The user specifies the subject by verbally inputting words that include one or more terms, such as "melon", "red," or the like, for example.

The conversion section 103a is realized by the sound processing section 34.

The extraction section 104 extracts characteristics for detecting the subject from the words specifying the subject, which were converted via the conversion section 103a. The extraction section 104 extracts, from the words that the sound input section 33 received as sound input, characteristics related to attributes of the words by extracting terms such as "melon" or "red" via an arbitrary well-known technique (such as morphological analysis), for example.

The extraction section 104 is realized by the CPU 21.

The identifying section 105 identifies attributes for specifying the subject from the words input via the input section 103. Specifically, the identifying section 105 compares the various terms extracted by the extraction section 104 with pre-stored attribute-identifying information, and identifies the attributes of the various extracted terms associated with specifying the subject.

Figure 3A:
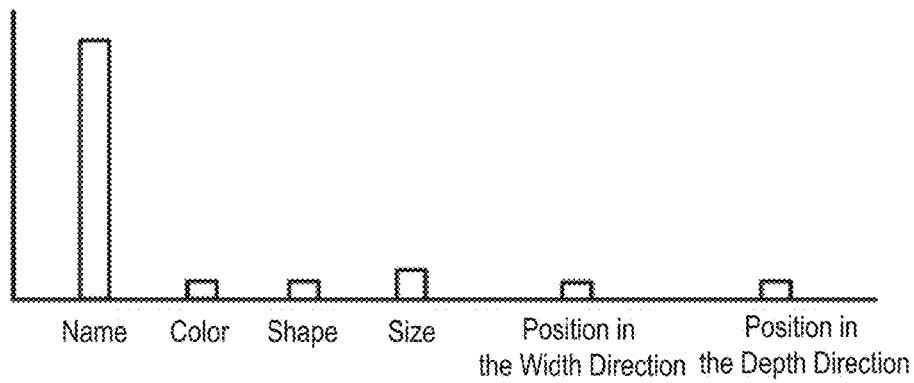
FIG. 3A shows attribute-identifying information for the term "melon."
Figure 3B:
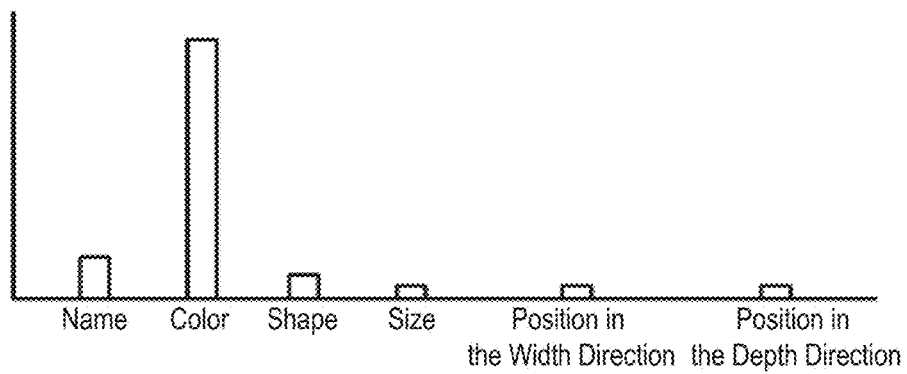
FIG. 3B shows attribute-identifying information for the term "red."
Figure 3C:
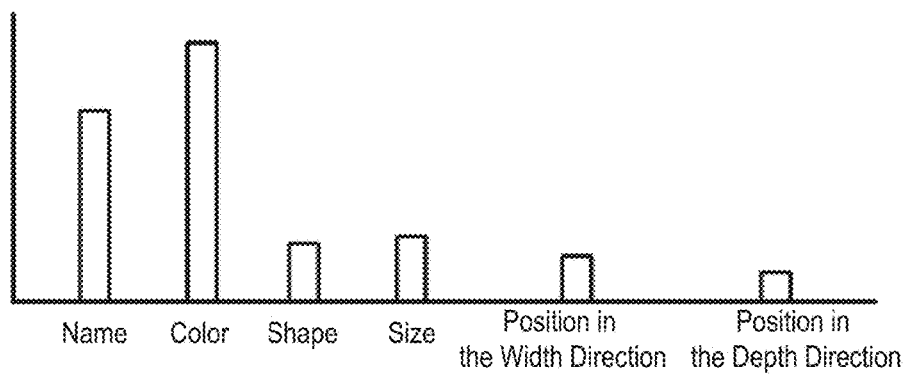
FIG. 3C shows attribute-identifying information for the term "violet."

As shown in FIGS. 3A to 3C, terms that may be extracted from the words that were input have been stored in the attribute-identifying information, and evaluation values related to the "name," "color," "shape," "position in the width direction," and "position in the depth direction" attributes of the various terms have been assigned and stored in the attribute-identifying information. Here, the evaluation values related to the various attribute values for each term represent the possibility that each term is a characteristic related to the attribute (the possibility that each term is one of the attribute values held by the attribute).

As shown in FIG. 3A, the attribute with the highest evaluation value for the term "melon" is "name," for example. This means that there is a high probability that the term "melon" is a characteristic defining the attribute "name." If the evaluation value of the attribute "name" is greater than or equal to a prescribed threshold (50%, for example), the identifying section 105 identifies that the attribute, for specifying the subject, of the term "melon" is "name."

As shown in FIG. 3B, the attribute with the highest evaluation value for the term "red" is "color." This means that there is a high probability that the term "red" is a characteristic defining the attribute "color." If the evaluation value of the attribute "color" is greater than or equal a prescribed threshold, the identifying section 105 identifies that the attribute, for specifying the subject, of the term "red" is "color."

As shown in FIG. 3C, the evaluation value of the attribute "name" and the evaluation value of the attribute "color" are both high for the term "violet." This means that the probability that the term "violet" is a related characteristic is high for both the attribute "name" and the attribute "color." If the evaluation values of both the attribute "name" and the attribute "color" exceed a prescribed threshold, the identifying section 105 identifies that the attributes, for identifying the subject, of the term "violet" are "name" and "color."

The attribute-identifying information may be created, as appropriate, ahead of time by an arbitrary method and then stored in the identifying section 105. The attribute-identifying information can be created by statistically analyzing how the various terms are used via text mining or the like, for example.

The identifying section 105 may take into account the results of the object, color, and facial recognition processing performed by the recognition section 101 when determining the attributes for specifying the subject.

There are cases where the term "violet" refers to the color "violet," and cases where the term refers to the name "Violet," for example. When a facial image region is not recognized from the target image TG after object, color, and facial recognition processing have been conducted by the recognition section 101, there is a high probability that the target image TG does not include a human subject. There is therefore a low probability that the term "violet" is referring to a name (of a person). In other words, there is a low probability that the attribute, for specifying the subject, of the term "violet" is "name." In such a case, the identifying section 105 can more accurately determine the attribute of the term by performing an operation, such as lowering the evaluation value of the attribute "name" for the term "violet," that decreases the possibility that "name" will be identified as the attribute for specifying the subject. Another example of such a situation is the term "rose," which in some cases refers to the color "rose," and in other cases refers to the name "Rose."

In addition, the identifying section 105 can determine whether or not the attributes for specifying the subject are a combination of a plurality of attributes by using an arbitrary well-known technique to determine whether or not any of the terms acquired from the input words modify each other.

The identifying section 105 is realized via a combination of the CPU 21 and the primary storage section 23.

The selection section 106 selects a method of detection of the subject in accordance with the attribute for specifying the subject, which was determined by the identifying section 105.

Specifically, the selection section 106 selects an "object detection" method of detection when the identifying section 105 has identified that "name" is the attribute for specifying the subject.

The selection section 106 selects a "color detection" method of detection when the identifying section 105 has identified that "color" is the attribute for specifying the subject.

The selection section 106 selects a "shape detection" method of detection when the identifying section 105 has identified that "shape" is the attribute for specifying the subject.

The selection section 106 selects a "size detection" method of detection when the identifying section 105 has identified that "size" is the attribute for specifying the subject.

The selection section 106 selects a "detection of the position in the width direction" method of detection when the identifying section 105 has identified that "position in the width direction" is the attribute for specifying the subject.

The selection section 106 selects a "detection of the position in the depth direction" method of detection when the identifying section 105 has identified that "position in the depth direction" is the attribute related to specifying the subject.

The selection section 106 selects a "combination detection" method of detection when the identifying section 105 has identified that there are a combination of a plurality of attributes for specifying the subject (in other words, when the identifying section 105 has determined that a modifying structure exists between the terms acquired from the words that were input).

The selection section 106 is realized by the CPU 21.

The characteristic information storage section 107 stores characteristic information. Characteristic information is information that represents characteristics of terms that may be input as words for specifying the subject.

To be more specific, the characteristic information includes a characteristic information table and a detection priority table.

FIG. 4A shows an example of a characteristic information table of terms classified as fruits. The characteristic information table FE assigns and stores values in the various categories of classification, "image," "color," "shape,"

"similar objects," and "related terms" for each of the terms related to the attribute of "name."

"Image" indicates image data for performing image comparison with the object OB recognized within the target image TG." Collated Image #1," which is assigned to "watermelon," is a previously captured image of a watermelon, for example.

"Color" and "shape" are the typical color and shape of the object indicated by each term. The preset colors of "watermelon" are "green" and "black," and the preset shape of "watermelon" is "round," for example.

"Similar objects" are other objects that are similar to the object indicated by each term. "Melon" has been preset as a similar object for "watermelon," for example.

"Related terms" are other terms that are related to each term. "Striped," "seed," and "summer" are terms that have been preset as related terms for "watermelon," for example.

The characteristic information table FE assigns and stores this characteristic information for each of the various terms, such as "watermelon" and "banana."

An example of a detection priority table is shown in FIG. 4B. A detection priority table PR is a table used when performing detection via a name detection method, which is a type of detection method that will be explained later. The detection priority table PR stores a level of priority that indicates which category detection method will be used to detect the subject for each classification, such as "fruit," "buildings," and "vehicles." The selection section 106 selects a method of detection using an order of "image," "color," "shape," "similar objects," and "related terms" when a word indicating a name classified as a fruit, such as "melon," "watermelon," or the like, is input by the user, for example. On the other hand, the selection section 106 selects a method of detection using an order of "image," "shape," "color," "similar objects," and "related terms" when a word indicating a name classified as a "building" is input by the user. The detection section 108 attempts to detect the subject via each method of detection in the order selected by the selection section 106. The baseline values for each priority level are set so as to become higher as the priority level becomes higher.

The characteristic information storage section 107 is realized by the primary storage section 23.

The detection section 108 detects the subject via the method of detection selected by the selection section 106. Specifically, the detection section 108 includes: a name detection section 108a, a color detection section 108b, a shape detection section 108c, a position and size detection section 108d, a similar object detection section 108e, and a related term detection section 108f. The detection section 108 detects the subject via a method of detection that uses a detection engine selected by the selection section 106 from among these detection engines. Each detection engine will be explained later in more detail.

The detection section 108 is realized by the CPU 21.

The execution section 109 executes AF (autofocus) processing for imaging performed by the imaging section 110 on the subject detected by the detection section 108. In other words, the execution section 109 displays a focus frame that encompasses the subject detected by the detection section 108, and causes the subject to be imaged by controlling the imaging section 110 and focusing on the subject.

The execution section 109 is realized by a combination of the CPU 21 and the display section 31.

The imaging section 110, in accordance with the AF processing executed by the execution section 109, images the subject when the subject is in focus by controlling the image section 10.

The imaging section 110 is realized by a combination of the image section 10 and the CPU 21.

Next, image processing carried out by a detection apparatus 1 having the above-mentioned hardware configuration and functional configuration will be explained while referring to the flow chart in FIG. 5.

When a user wishes to image a subject by causing the detection apparatus 1 to detect the subject via the user verbally inputting words specifying the subject, the user operates a mode selection button included in an operation section 32 and selects "sound input mode," which is one of a plurality of operational modes, such as blurred image prevention mode and red eye prevention mode, included in the detection apparatus 1.

In response to the above-mentioned operation, the image section 10 begins imaging the object OB, which is a candidate for the subject, and provides the captured image data to the image output section 24.

The image output section 24 generates a live view image in accordance with the provided image data. The image output section 24, along with regularly storing provided images in the temporary storage section 22, provides generated live view images to the display section 31. The display section 31 displays the provided live view images.

Figure 5:
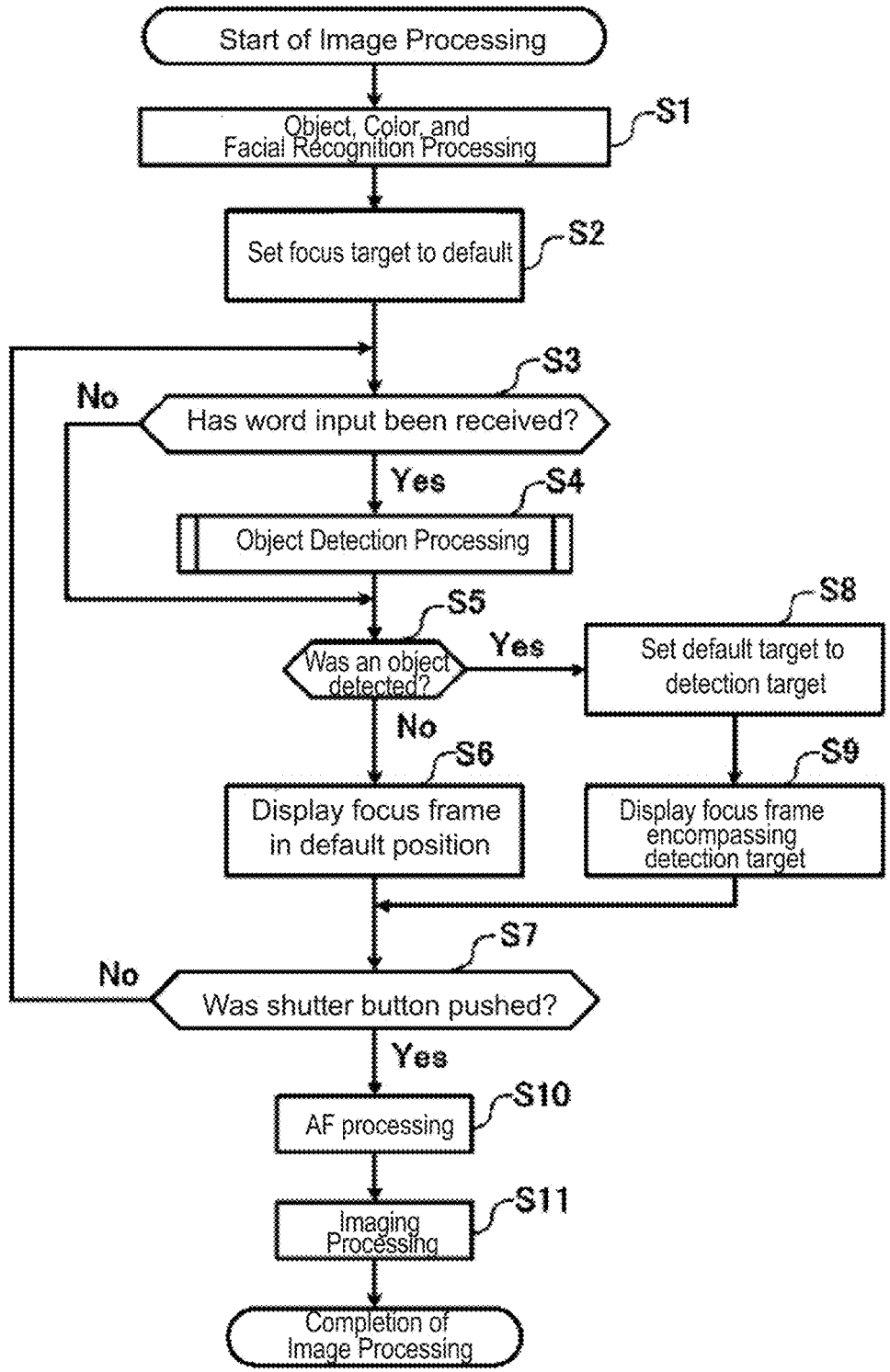
FIG. 5 is a flow chart that explains image processing performed by a detection apparatus according to an embodiment.

When this acquisition of a live view image begins, the CPU 21 begins following the image processing indicated in the flow chart in FIG. 5.

First, the recognition section 101 acquires one frame of captured image data from the temporary storage section 22 as a target image TG, and performs object, color, and facial recognition processing on the target image TG (Step S1).

During object, color, and facial recognition processing, the recognition section 101 uses an arbitrary well-known technique to recognize the object OB included in the target image TG by analyzing the color distribution, shape (contour and pattern, for example), and the like of the target image TG. In addition, the recognition section 101 uses an arbitrary well-known technique related to facial detection to recognize a facial region in the target image TG.

After carrying out object, color, and facial recognition processing, the imaging section 110 sets a focus object as the default (Step S2). Specifically, the imaging section 110 sets the facial region as the focus object when a facial region is recognized during the object, color, and facial recognition processing of Step S1, and sets as the focus object the center of the target image TG acquired in Step S2 when a facial region is not recognized.

Next, the input section 103 determines whether or not the input section 103 has received an input of words (Step S3). If the input section 103 determines that an input of words has not been received (Step S3: No), the processing proceeds to Step S5.

If the input section 103 determines that an input of words has been received (Step S3: Yes), the CPU 21 detects the subject by executing object detection processing (Step S4).

The object detection processing from Step S4 will be explained in detail here with reference to the flow chart in FIG. 6.

Figure 6:
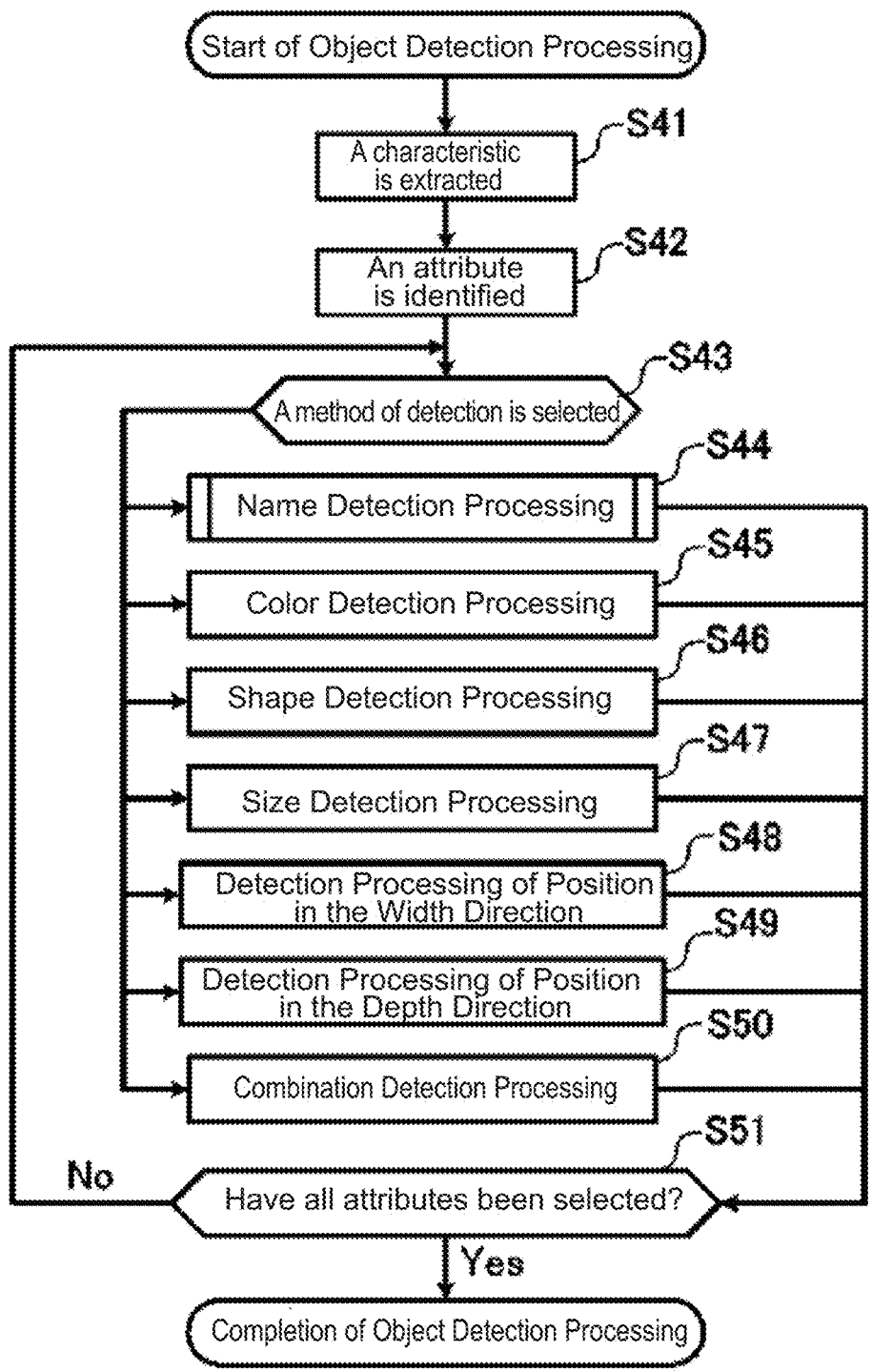
FIG. 6 is a flow chart that explains object detection processing performed by a detection apparatus according to an embodiment.

When the object detection processing shown in FIG. 6 begins, the extraction section 104 first extracts characteristics for detecting the subject from the words received as input in Step S3 (Step S41), and the identifying section 105 then identifies attributes for specifying the subject from the characteristics that were extracted (Step S42).

Specifically, the extraction section 104 first uses an arbitrary well-known technique (morphological analysis, for example) to extract terms such as "melon," "red," or the like from the words received as input in Step S3. If the words received as input contain a plurality of characteristics, such as "red apple," the extraction section 104 extracts all of the characteristics included in the words that were received as input.

The identifying section 105 identifies attributes from each of the extracted terms in accordance with the results of the object, color, and facial recognition processing from Step S1 and the pre-stored attribute-identifying information. To be more specific, the identifying section 105 identifies, for each term, all attributes in the attribute-identifying information with an evaluation value that is greater than or equal to a predetermined threshold (50%, for example) as attributes for specifying the subject.

After identifying all of the attributes of the terms acquired from the words input in Step S3, the identifying section 105 uses an arbitrary well-known technique to determine whether or not the attributes related to specifying the subject are a combination of a plurality of attributes by determining whether or not there is a modifying relationship between the terms. This concludes the processing in Step S42.

Next, the selection section 106 selects the method of detection of the subject based on the attributes for specifying the subject, which were identified in Step S42 (Step S43). Specifically, the selection section 106 selects one selection method from among "name detection," "color detection," "shape detection," "size detection," "detection of position in the width direction," "detection of position in the depth direction," and "combination detection" based on the attributes related to specifying the subject as identified by the identifying section 105.

Next, the detection section 108 detects the subject via the method of detection selected by the selection section 106 in Step S43.

If the "name detection" method of detection is selected in Step S43, the name detection section 108a included in the detection section 108 carries out "name detection processing" (Step S44). Specifically, the detection section 108 detects the subject by comparing the characteristics of the object OB recognized in the object, color, and facial recognition processing in Step 1 of the flow chart shown in FIG. 5 to the characteristics extracted from the input words by the extraction section 104 in Step S42.

Figure 7:
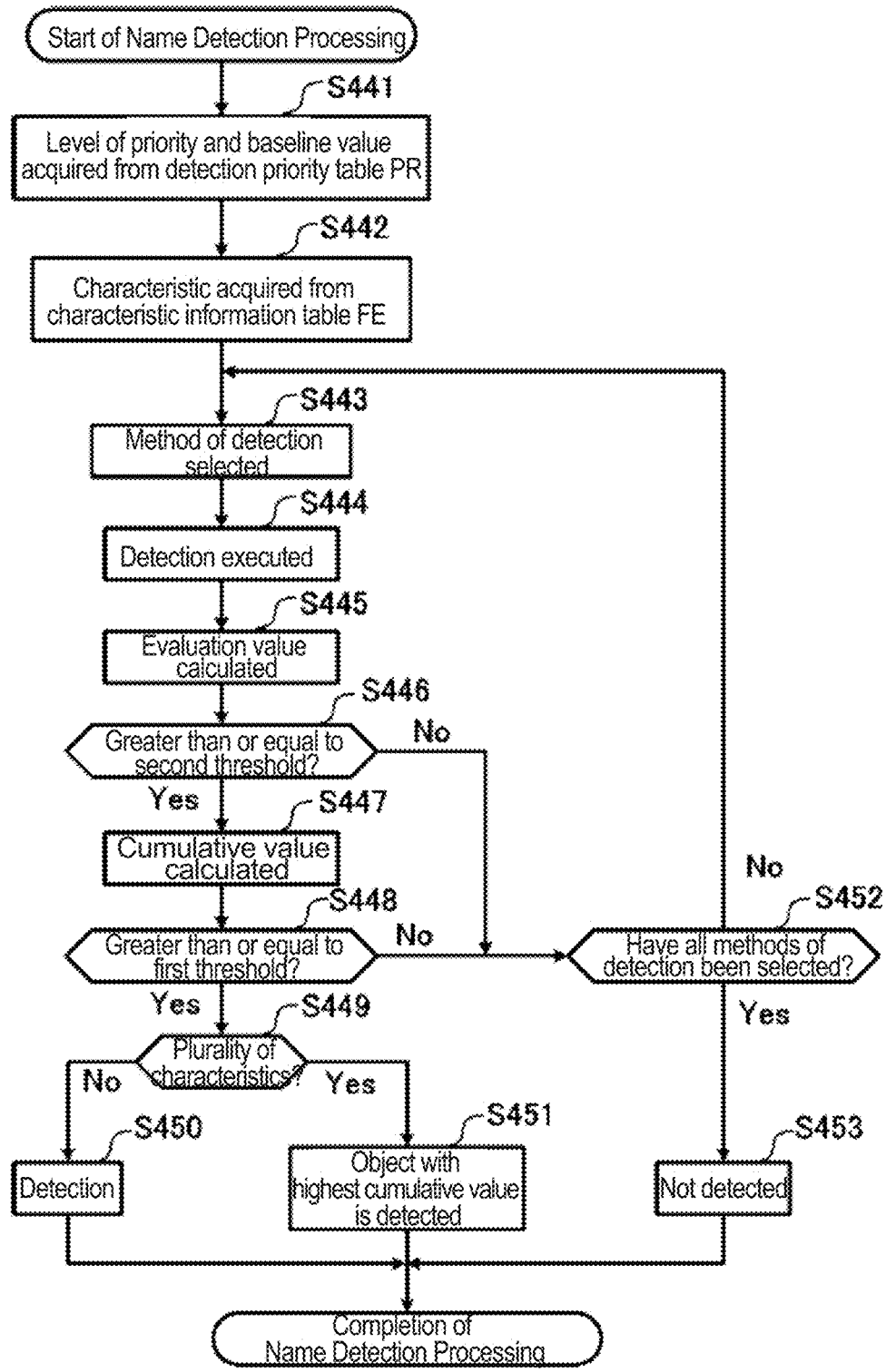
FIG. 7 is a flow chart that explains name detection processing performed by a detection apparatus according to an embodiment.

The "name detection processing" from Step S44 will be explained in detail here with reference to the flow chart shown in FIG. 7.

When beginning name detection processing, the name detection section 108a first acquires a level of priority and a baseline value for each of the categories of "image," "color," "shape," "similar objects," and "related terms" from the detection priority table PR included in the characteristic information related to "name" stored in the characteristic information storage section 107 (Step S441).

Specifically, the name detection section 108a selects a term for which the attribute related to specifying the subject was identified to be "name" in Step S42 of the flow chart shown in FIG. 6, and acquires the "classification" assigned and stored for the term by referring to the characteristic information table FE. The name detection section 108a next refers to the detection priority table PR, and acquires the levels of priority and baseline values for the categories assigned to and stored under the acquired "classification."

Next, the name detection section 108a, by referring to the characteristic information table FE, acquires the values for each of the categories of "image," "color," "shape," "similar objects," and "related terms" assigned to and stored under the term selected in Step S441 (Step S442).

Next, the selection section 106 selects a method of detection of the subject in accordance with the category priority levels acquired in Step S441 (Step S443). Specifically, the selection section 106 first selects a method of detection that corresponds to the category set to have the highest level of priority.

The detection section 108 acquires, by executing detection according to the method of detection selected in Step S443 (Step S444), a level of match for each of the objects OB recognized in Step S1 of the flow chart shown in FIG. 5. This level of match is between the characteristics of each object OB, which are candidates for the subject, acquired in the object, color, and facial recognition processing of Step S1 and the characteristics extracted from words in Step S41 of the flow chart shown in FIG. 6.

After the detection in Step S444 is executed, the name detection section 108a calculates an evaluation value (Step S445). Specifically, the name detection section 108a calculates an evaluation value for each of the objects OB by multiplying the baseline value assigned and stored for each level of priority acquired in Step S441 and the level of match acquired in Step S444.

Once the evaluation value has been calculated, the name detection section 108a determines whether or not an object OB that has an evaluation value above a second threshold value exists (Step S446). This second threshold value is the basis for determining whether or not the calculated evaluation value will be used in determining if an object OB matches the characteristics extracted from the input words in Step S42. If the evaluation value is low, the name detection section 108a determines that the evaluation value will not be used in order to prevent incorrect matches.

If an object OB that has a calculated evaluation value that exceeds the second threshold exists (Step S446: Yes), the name detection section 108a calculates a cumulative evaluation value for evaluation values that exceed the second threshold value (Step S447). Specifically, the name detection section 108a calculates the cumulative evaluation value by adding the evaluation value calculated for each object OB to the previously acquired evaluation value. Since the detection here was conducted according to the category which has been set to have the highest level of priority, a previously acquired evaluation value does not exist. This means that the cumulative evaluation value will be the same as the evaluation value calculated in Step S445.

If an object OB for which the calculated evaluation value is greater than or equal to the second threshold does not exist (Step S446: No), the name detection section 108a determines whether or not the name detection section 108a has completed detection for the methods of detection corresponding to all of the categories, for which a level of priority and a baseline value have been set, stored in the characteristic information related to "name" (Step S452).

Since the detection here was conducted according to the category which has been set to have the highest level of priority, the name detection section 108a determines that there is a category, among the categories stored in the characteristic information related to "name," for which detection according to a corresponding detection method has not been carried out (Step S452: No), and returns to Step S443.

After calculating the cumulative evaluation value in Step S447, the name detection section 108a determines whether or not there is an object OB for which the calculated cumulative evaluation value is greater than or equal to a first threshold value (Step S448). This first threshold value is the basis for whether or not it can be determined that an object OB matches the characteristic extracted from the input words in Step S42. If the cumulative evaluation value is high, the name detection section 108a determines that the object OB matches the extracted characteristic. If no object OB has a cumulative evaluation value that is greater than or equal to the first threshold (Step S448: No), the processing proceeds to Step S452.

If it is determined that there is an object OB for which the cumulative evaluation value is greater than or equal to the first threshold value (Step S448: Yes), the name detection section 108a determines whether or not there are a plurality of objects OB for which the cumulative evaluation value is greater than or equal to the first threshold value (Step S449). If it is determined that there are not a plurality of objects OB for which the cumulative evaluation value is greater than or equal to the first threshold value (Step S449: No), the name detection section 108a detects as a subject the one object OB which has a cumulative evaluation value greater than or equal to the first threshold value (Step S450) and ends name detection processing.

If it is determined that there are a plurality of objects OB for which the cumulative evaluation value is greater than or equal to the first threshold value (Step S449: Yes), the name detection section 108a detects as a subject the object OB with the largest cumulative evaluation value among the plurality of objects OB (Step S451), and ends name detection processing.

If it is determined in Step 448 that there is no object OB which has a cumulative evaluation value that is greater than or equal to the first threshold value (Step S448: No), the name detection section 108a determines whether or not the name detection section 108a has completed detection according to the methods of detection corresponding to all of the categories, for which a level of priority and baseline value have been set, stored in the characteristic information related to "name" (Step S452).

If it is determined that the name detection section 108a has completed detection according to the methods of detection corresponding to all of the categories stored in the characteristic information related to "name" (Step S452: Yes), the name detection section 108a generates information indicating that a subject was not detected (Step S453), and ends name detection processing.

If it is determined there is a category among the categories stored in the characteristic information related to "name" for which detection according to the corresponding detection method has not been carried out (Step S452: No), the processing returns to Step S443. The selection section 106 then selects a method of detection corresponding to the category having a second level of priority among the categories stored in the characteristic information related to "name."

The selection section 106 repeats this processing until either it is determined that there is an object OB for which the cumulative evaluation value is greater than or equal to the first threshold value or it is determined that detection according to the methods of detection corresponding to all of the categories stored in the characteristic information related to "name" has been completed.

Here, "name detection processing" will be explained in more detail, using target image TGa in FIG. 8 as an example, under the supposition that the term "melon" was input as the word specifying the subject in Step S3 of the flow chart shown in FIG. 5.

Figure 8:
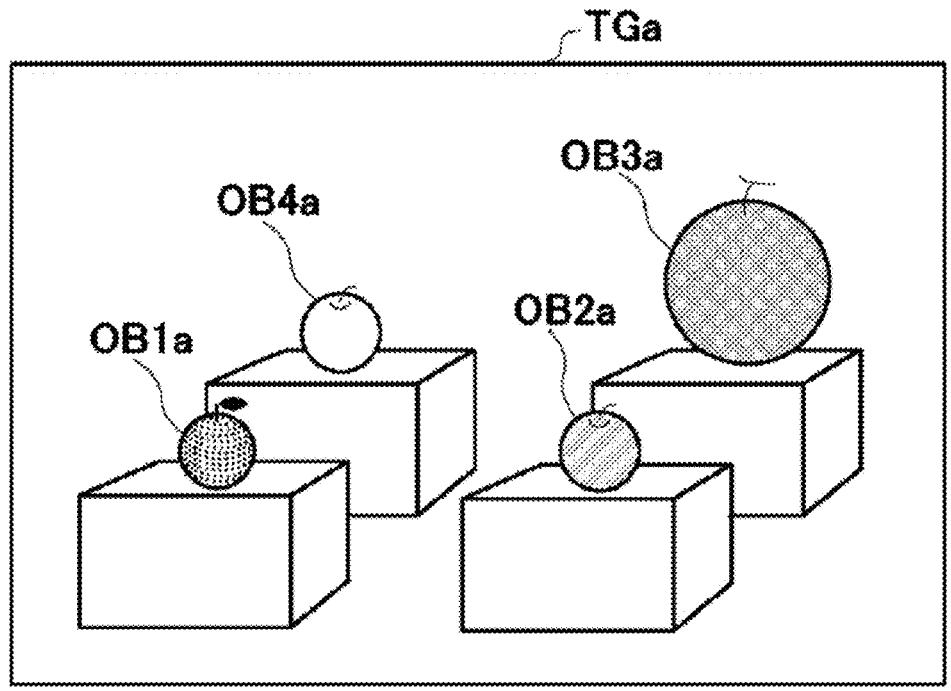
FIG. 8 shows an example of a target image.

Here, the target image TGa includes the objects OB1a to OB4a, as shown in FIG. 8. Object OB1a is an orange tangerine, object OB2a is a green apple, object OB3a is a melon, and object OB4a is a red apple.

When the "name detection processing" in Step S44 is begun, the name detection section 108a acquires the classification "fruit" assigned and stored to the term "melon", which is a name, by referring to the characteristic information table FE that includes the characteristic information related to "name."

Next, the name detection section 108a acquires the level of priority and baseline value for each of the categories of "image," "color," "shape," "similar objects," and "related terms" assigned and stored under the classification "fruit" by referring to the detection priority table PR included in the characteristic information related to "name."

The name detection section 108a then determines a level of match for each of the categories in order of highest priority level (Step S444), calculates an evaluation value from the level of match and the baseline value (Step S445), and, after completing the formula below, identifies objects OB that satisfy the formula as objects that were detected (Steps S446 to S448).

$$\begin{aligned}&(\text{Level of match for category with highest priority level} \times \text{baseline value}) + (\text{level of match for category with second highest priority level} \times \text{baseline value}) + (\text{level of match for category with third highest priority level} \times \text{baseline value}) + \\&(\text{level of match for category with fourth highest priority level} \times \text{baseline value}) + (\text{level of match for category with fifth highest priority level} \times \text{baseline value}) \geq \text{first threshold value}\end{aligned} \quad \text{<Formula 1>}$$

(However, values for which (level of match×baseline value)<the second threshold value, are not used in calculating the cumulative evaluation value [Step S446].)

A more specific explanation will be given using the case of the input term "melon" (classification "fruit") for which the first threshold value has been set to 80 and the second threshold value has been set to 20. As shown in FIG. 4B, "image" is the category set to have the highest level of priority in the detection priority table PR. Via "image-matching processing," which is a method of detection corresponding to the category which has the highest level of priority, "image," the name detection section 108a attempts to carry out detection by acquiring a level of match with collated image #4, which is the value for the category "image" assigned and stored for the term "melon" in the characteristic information table FE shown in FIG. 4A.

(1) If the level of match between collated image #4 and the object OB3a is 85% after detection via the category "image" is completed, the evaluation value is calculated as 100 (baseline value)×85% (level of match)=85. This evaluation value of 85 is larger than the first threshold of 80. As a result, the name detection section 108a determines that the object OB3a was detected as the subject.

(2) If the level of match between collated image #4 and the object OB3a is 60% after detection via the category "image" is completed, the evaluation value is calculated as 100 (baseline value)×60% (level of match)=60. This evaluation value of 60 is smaller than the first threshold value of 80. In such a case, the name detection section 108a temporarily stores the evaluation value of 60 as the cumulative evaluation value.

Next, the name detection section 108a attempts to carry out, via "color detection processing" (which is the method of detection corresponding to the category with the second highest level of priority, "color"), detection by "green," which is the value in the category "color" assigned and stored for the term "melon" in the characteristic information table FE shown in FIG. 4A. If the level of match between the value "green" and the object OB3*a* is 90% after the above-mentioned detection is carried out, the evaluation value is calculated as 80 (baseline value)×90% (level of match)=72. This evaluation value is added to the cumulative evaluation value of 60 that was temporarily stored. This produces a new cumulative value of 60+72=132. This cumulative evaluation value of 132 is larger than the first threshold of 80. As a result, the name detection section 108*a* determines that the object OB3*a* was detected as the subject.

(3) If the level of match between collated image #4 and the object OB3*a* is 40% after detection via the category "image" is completed, the evaluation value is calculated as 100 (baseline value)×40% (level of match)=40. Since this evaluation value of 40 is smaller than the first threshold value of 80, the name detection section 108*a* temporarily stores the evaluation value of 40 as the cumulative evaluation value.

Next, the name detection section 108*a* attempts to perform detection by the value "green" in the category with the second highest level of priority, "color." If the level of match between the value "green" and the object OB3*a* is 45% after detection has been completed, the evaluation value is calculated to be 36 (baseline value of 80× match level of 45%). This means that the new cumulative evaluation value is 76 (40+36). This cumulative evaluation value of 76 is smaller than the first threshold value of 80, so the name detection section 108*a* continues to temporarily store the cumulative evaluation value (which is now 76).

Next, via shape detection processing (which is the method of detection corresponding to the category with the third highest level or priority, "shape"), the name detection section 108*a* attempts detection by "round," which is the value in the category "shape" assigned and stored under the term "melon" in the characteristic information table FE shown in FIG. 4A. If the level of match between the value "round" and the object OB3*a* is 80% after detection has been completed, the evaluation value is calculated to be 48 (baseline value of 60× match level of 80%). This means that the new cumulative evaluation value is 124 (76+48). This cumulative evaluation value of 124 is larger than the first threshold of 80. As a result, the name detection section 108*a* determines that the object OB3*a* was detected as the subject.

(4) If the level of match between collated image #4 and the object OB3*a* is 15% after detection via "image" has been completed, the evaluation value is calculated as 15 (baseline value of 100× match level of 15%=15). This evaluation value of 15 is lower than the second threshold value of 20. As a result, the name detection section 108*a* determines that this evaluation value should not be used, and does not add this value to the cumulative value. The name detection section 108*a* then performs processing via the category with the next highest level of priority. Similarly, the name detection section 108*a* does not add the evaluation value of categories with other levels of priority to the cumulative evaluation value if the evaluation value is less than the second threshold value.

In a similar manner, the name detection section 108*a* continues to attempt detection until it is determined that there is an object OB which has a cumulative evaluation value that is greater than or equal to the first threshold, or it is determined that detection via the methods of detection corresponding to all of the categories stored in the characteristic information associated with "name" has been completed. This means that until one of these two determinations has been made, the name detection section 108*a* attempts, via "similar object detection" (which is the detection method corresponding to the category with the fourth highest level of priority, "similar objects"), detection by "watermelon," which is the value in the category "similar objects" assigned and stored for the term "melon" in the characteristic information table FE shown in FIG. 4A, and then attempts, via "related term detection processing" (which is the detection method corresponding to the category with the fifth highest level of priority, "related terms"), detection via the terms "seed," "net," and "expensive," which are the values in the category "related terms" assigned and stored for the term "melon" in the characteristic information table FE shown in FIG. 4A. If an object OB satisfying the above mentioned formula ({[match level of category with first level of priority×baseline value]+[match level of category with second level of priority×baseline value]+[match level of category with third level of priority×baseline value]+[match level of category with fourth level of priority×baseline value]+[match level of category with fifth level of priority×baseline value]}≥first threshold value) does not exist after the completion of detection via the methods of detection corresponding to all of the categories stored in the characteristic information associated with "name," the name detection section 108*a* determines that a subject was not detected.

The methods of detection for each of the categories, which are carried out as one part of "name detection processing," will be explained hereafter in more detail. "Color detection processing," which is the method of detection corresponding to the category "color," and "shape detection processing," which is the method of detection corresponding to the category "shape," will be explained in more detail later. Here, "similar object detection processing," which is the method of detection corresponding to the category "similar objects," and "related term detection processing," which is the method of detection corresponding to the category "related terms," will be explained.

"Similar object detection processing" is executed by the similar object detection section 108*e* included in the detection section 108.

If "melon" is input as the word associated with specifying the subject in Step S3 of the flow chart shown in FIG. 5 and "similar object detection processing" is carried out on the target image TGa shown in FIG. 8, the similar object detection section 108*e* first refers to the characteristic information table FE shown in FIG. 4A. The similar object detection section 108*e* then acquires from the table the term "watermelon," which is the value in the category "similar objects" for the term "melon."

Next, the similar object detection section 108*e* refers to the characteristic information table shown in FIG. 4A and acquires collated image #1, which is the value in the category "image" for the term "watermelon."

The similar object detection section 108*e* detects the subject by comparing the image data representing each object OB recognized by the object, color, and facial recognition processing in Step S1 of the flow chart shown in FIG. 5 to collated image #1.

In this way, the similar object detection section 108*e* acquires other terms during "similar object detection processing." These acquired terms are terms that have been stored under the category of "similar objects" for each of the terms being used to determine the subject. The similar object detection section 108*e* then acquires collated images stored under the category "image" for each of the acquired terms, and detects the subject by comparing the collated images to image data representing each object OB recognized by the object, color, and facial recognition processing in Step S1 of the flow chart shown in FIG. 5.

"Related term detection processing" is realized by the related term detection section 108f that is included in the detection section 108.

If "melon" is input as the word associated with specifying the subject in Step S3 of the flow chart shown in FIG. 5 and "related term detection processing" is carried out on the target image TGa shown in FIG. 8, the related term detection section 108f first refers to the characteristic information table FE shown in FIG. 4A and acquires the terms "seed," "net," and "expensive," which are values in the category "related terms," assigned and stored under the term "melon."

Next, the related term detection section 108f refers to the characteristic information table FE, and acquires the terms "watermelon," "apple," and "grape," which are terms that differ from the term "melon" and under which the terms "seed," "net," and "expensive" have been assigned and stored.

Next, the related term detection section 108f refers to the characteristic information table FE, and acquires collated image #1, collated image #5, and collated image #6, which are values in the category "image," that are assigned and stored under the acquired terms "watermelon," "apple," and "grape." The related term detection section 108f attempts to detect the subject by comparing the image data representing each object OB recognized by the object, color, and facial recognition processing in Step S1 of the flow chart shown in FIG. 5 with collated image #1, collated image #5, and collated image #6.

In this way, the related term detection section 108f acquires, during "related term detection processing," values in the category "related terms" that are assigned and stored under the various terms in the characteristic information table FE. The related term detection section 108f then acquires other terms assigned and stored under the previously acquired terms. The related term detection section 108f then acquires collated images that have been assigned to the other terms and that have been stored as values in the category "image" in the characteristic information table FE, and then detects the subject by comparing the collated images to image data representing each of the objects OB recognized by the object, color, and facial recognition processing in Step S1 of the flow chart shown in FIG. 5.

Returning to the flow chart shown in FIG. 6, processing proceeds to Step S51 after the "name detection processing" in Step S44 is completed.

If "color detection" is selected as the method of detection in Step S43, the color detection section 108b included in the detection section 108 executes "color detection processing" (Step S45).

Figure 9:
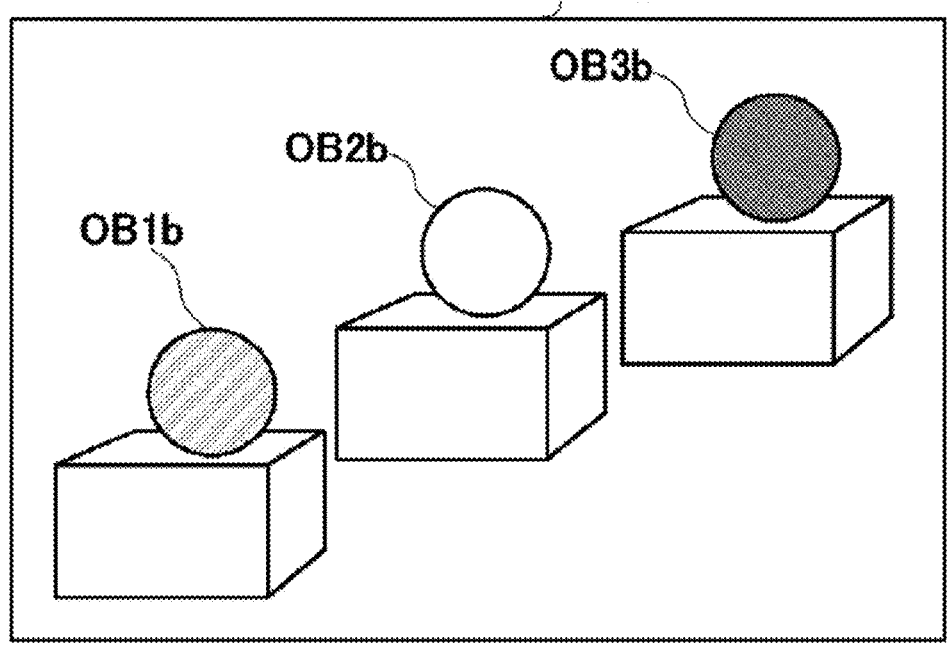
FIG. 9 shows another example of a target image.

The "color detection processing" carried out by the color detection section 108b will be explained in detail, using the target image TGb shown in FIG. 9 as an example, under the supposition that the term "red" was input as the word specifying the subject in Step S3 of the flow chart shown in FIG. 5. The target image TGb includes a plurality of objects OB1b to OB3b that each have a different color. Target object OB1b is green, target object OB2b is red, and target object OB3b is blue.

During the "color detection processing" in Step S45, the color detection section 108b detects objects OB that have a characteristic similar to the characteristic of "red," the term "red" having been extracted in Step S41 by the extraction section 104 and used in Step S42 to identify the attribute for specifying the subject. The color detection section 108b carries out this detection in accordance with information that indicates the color distribution of each of the objects OB recognized by the recognition section 101 in Step S1. Specifically, the color detection section 108b detects objects OB that have a pixel value within a prescribed range that corresponds to "red" by analyzing the pixel values within the areas of each of the objects OB within the target image TGb. In the example of performing color detection on the target image TGb, the detection section 108 detects the red object OB2b as the subject from among the three objects OB1b to OB3b in the target image TGb.

Processing proceeds to Step S51 after the "color detection processing" in Step S45 is completed.

If "shape detection" is selected as the method of detection in Step S43, the shape detection section 108c included in the detection section 108 executes "shape detection processing" (Step S46).

Figure 10:
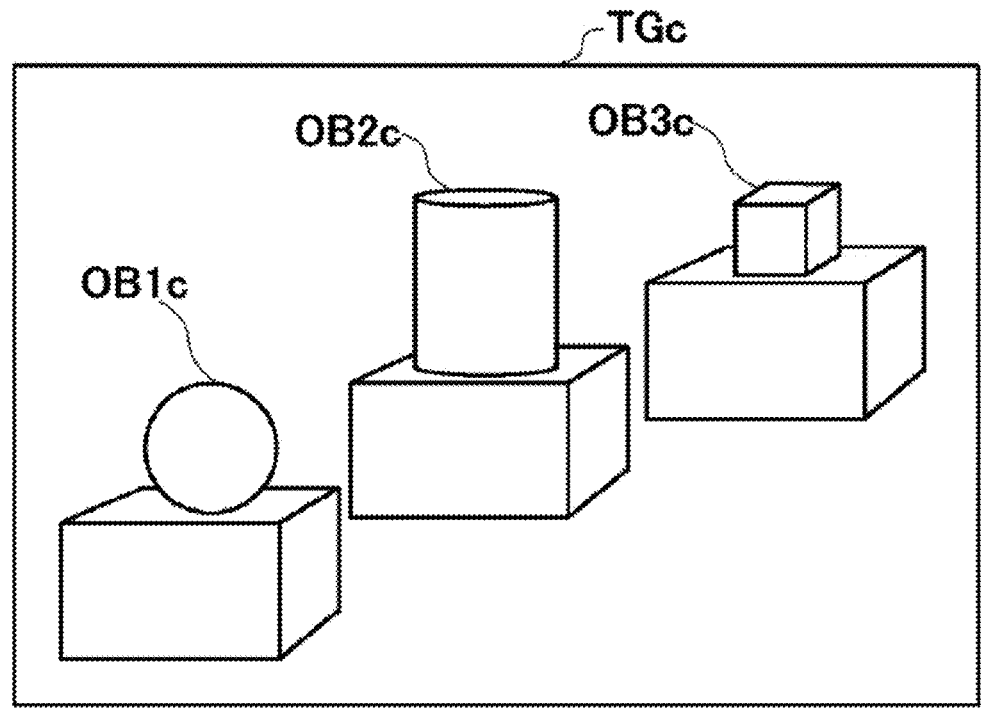
FIG. 10 shows another example of a target image.

The "shape detection processing" carried out by the shape detection section 108c will be explained in detail, using the target image TGc shown in FIG. 10 as an example, under the supposition that the term "round" was input as the word specifying the subject in Step S3 of the flow chart shown in FIG. 5. The target image TGc includes a plurality of objects OB1c to OB3c that each have a different shape. Object OB1c is round, object OB2c is cylindrical, and object OB3c is cuboid.

During the "shape detection processing" in Step S45, the shape detection section 108c detects objects OB having a characteristic similar to the characteristic of "round," the term "round" having been extracted in Step S41 by the extraction section 104 and used in Step S42 to identify the attribute for specifying the subject. The shape detection section 108c carries out this detection in accordance with information that indicates the shape of each of the objects OB recognized by the recognition section 101 in Step S1. Specifically, the shape detection section 108c detects objects OB having a shape corresponding to "round" by analyzing shape via the contour of each of the objects OB in the target image TGc. In the example of performing shape detection on the image TGc, the detection section 108 detects the round object OB1c as the subject among the three objects OB1c to OB3c in the target image TGc.

Processing proceeds to Step S51 after the "shape detection processing" in Step S45 is completed.

If "size detection" is selected as the method of detection in Step S43, the position and size detection section 108d included in the detection section 108 executes "size detection processing" (Step S47).

Figure 11:
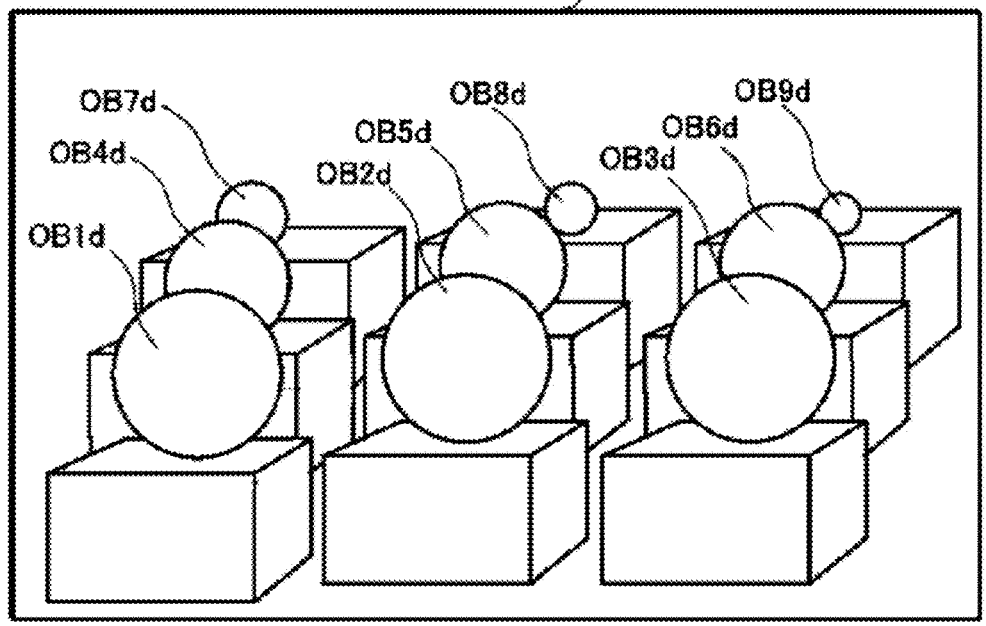
FIG. 11 shows another example of a target image.

The "size detection processing" carried out by the position and size detection section 108d will be explained in detail, using the target image TGd shown in FIG. 11 as an example, under the supposition that the term "large" was input as the word specifying the subject in Step S3 of the flow chart shown in FIG. 5. The target image TGd includes a plurality of objects OB1d to OB9d that are different sizes. Specifically, objects OB1d to OB3d are the largest objects, objects OB4d to OB6d are of a medium size, and objects OB7d to OB9d are the smallest objects.

During the "size detection processing" in Step S47, the position and size detection section 108d detects, from among the objects recognized by the recognition section 101 in Step S1, objects OB that have a characteristic similar to the characteristic of "large," the term "large" having been extracted in Step S41 by the extraction section 104 and used in Step S42 to identify the attribute associated with specifying the subject. Specifically, the position and size detection section 108*d* detects objects OB that are relatively large by comparing the area of the region of each of the objects OB in the target image TGd. In the example of performing size detection on the target image TGd, the detection section 108 detects the largest objects OB1*d* to OB3*d* as the subjects from among the nine objects OB1*d* to OB9*d* in the target image TGd.

Processing proceeds to Step S51 after the "size detection processing" in Step S47 is completed.

If "detection processing of the position in the width direction" is selected as the method of detection in Step S43, the position and size detection section 108*d* included in the detection section 108 executes "detection processing of the position in the width direction" (Step S48).

The "detection processing of the position in the width direction" carried out by the position and size detection section 108*d* will be explained in detail, using the target image TGd shown in FIG. 11 as an example, under the supposition that the term "right side" was input as the word specifying the subject in Step S3 of the flow chart shown in FIG. 5. The target image TGd includes a plurality of objects OB1*d* to OB9*d* that each have a different position within the target image TGd.

During the "detection processing of the position in the width direction" in Step S48, the detection section 107 detects, from among the objects OB recognized by the recognition section 101 in Step S1, objects OB having a characteristic similar to the characteristic of "right side," the term "right side" having been extracted in Step S41 by the extraction section 104 and used in Step S42 to identify the attribute associated with specifying the subject. Specifically, the position and size detection section 108*d* detects objects OB that are relatively positioned to the right side by comparing the position of the region of each of the objects OB in the target image TGd. In the example of performing detection of the position in the width direction on the target image TGd, the detection section 108 detects the object OB9*d* that is positioned furthest to the right as the subject from among the nine objects OB1*d* to OB9*d* in the target image TGd.

Processing proceeds to Step S51 after the "detection processing of the position in the width direction" in Step S48 is completed.

If "detection of the position in the depth direction" is selected as the method of detection in Step S43, the position and size detection section 108*d* included in the detection section 108 carries out "detection processing of the position in the depth direction" (Step S49).

The "detection processing of the position in the depth direction" carried out by the position and size detection section 108*d* will be explained in detail, using the target image TGd shown in FIG. 11 as an example, under the supposition that the term "back" was input as the word specifying the subject in Step S3 of the flow chart shown in FIG. 5. The target image TGd includes a plurality of objects OB1*d* to OB9*d* that are at different distances from the detection apparatus 1.

During the "detection processing of the position in the depth direction" in Step S49, the position and size detection section 108*d* detects, from among the objects OB recognized by the recognition section 101 in Step S1, objects OB having a characteristic similar to the characteristic of "back," the term "back" having been extracted in Step S41 by the extraction section 104 and used in Step S42 to identify the attribute for specifying the subject. Specifically, the position and size detection section 108*d* detects objects OB that are relatively positioned in the back, or in other words, objects OB for which the distance measured by the distance measuring section 102 is relatively large, by comparing the distances measured by the distance measuring section 102 from the detection apparatus 1 to each of the objects OB. In the example of performing detection in the depth direction on the target image TGd, the detection section 108 detects the objects OB7*d* to OB9*d* that are positioned furthest to the back as the subjects from among the nine objects OB1*d* to OB9*d* in the target image TGd.

Processing proceeds to Step S51 after the "detection processing of the position in the depth direction" in Step S49 is completed.

If "combination detection" is selected as the method of detection in Step S43, the detection section 108 carries out "combination detection processing" (Step S50). Specifically, the detection section 108 detects a subject by combining the methods of detection of each of a plurality of attributes that make up the attributes associated with specifying the subject.

Specifically, the detection section 108 first carries out detection using the word that is being modified within the modifying structure extracted in Step S41 of the flow chart shown in FIG. 6. The detection section uses a method of detection that corresponds to the attribute of the above-mentioned word. Next, the detection section 108 executes additional detection on any objects OB that were detected in the above-mentioned step. This detection is carried out by using, one at a time, methods of detection that correspond to the attributes of each of the modifying terms contained in the modifying structure extracted in Step S41.

Here, the "combination detection processing" carried out by the detection section 108 will be explained in detail, using the target image TGe shown in FIG. 12 as example, under the supposition that the phrase "front petal" was input as the words specifying the subject in Step S3 of the flow chart shown in FIG. 5.

Figure 12:
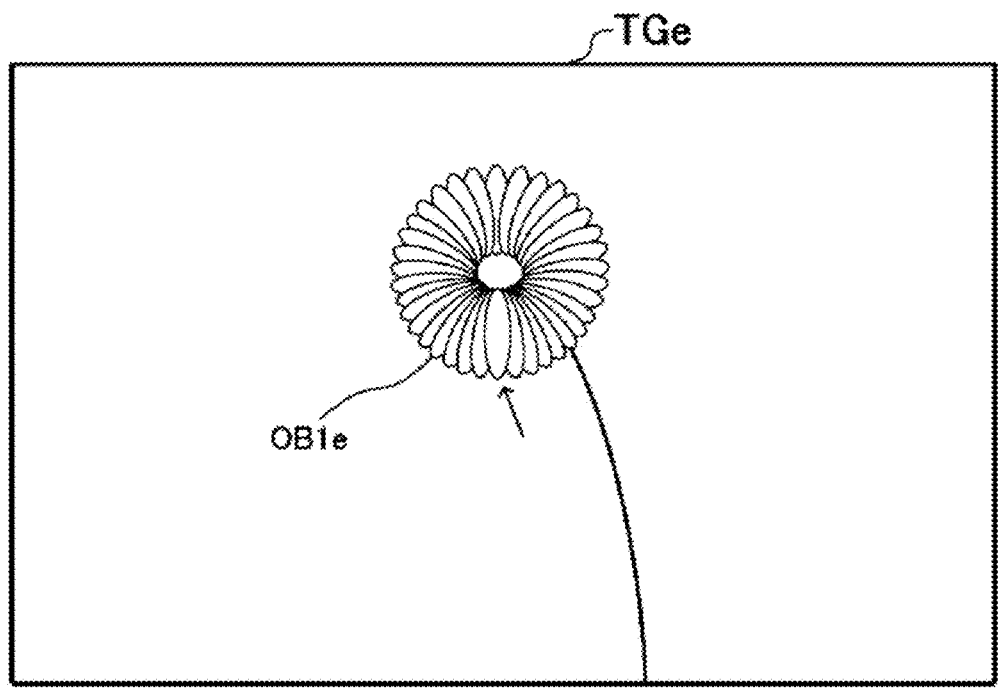
FIG. 12 shows another example of a target image.

As shown in FIG. 12, the target image TGe includes an object OB1*e*. The object OB1*e* is a flower that has petals.

In Step S41 of the flow chart shown in FIG. 6, the extraction section 104 extracts the modifier "front" and the modified word "petal" as the terms making up the modifying structure. Next, the attributes for specifying the subject are identified in Step S42. The detection section 108 then begins the "combination detection" in Step S50 via the term "front," for which the attribute is the position in the depth direction, and the term "petal," for which the attribute is name. When this processing is begun, the detection section 108 detects the petal portion of the object OB1*e* included in the target image TG by executing "name detection," which is the method of detection corresponding to "name," which is the attribute of the modified word "petal" associated with specifying the subject.

Next, the detection section 108 executes "detection of the position in the depth direction" for the term "front," which is the modifier among the terms making up the modifying structure. "Detection of the position in the depth direction" is the method of detection that corresponds to the attribute "position in the depth direction," which is the attribute of the word "front" that is associated with specifying the subject. When this detection is carried out, the detection section 108 detects the petal located in front (the petal indicated by an arrow in FIG. 12) as the subject from among the plurality of petals on the object OB1*e* detected via the previously mentioned "name detection."

Processing proceeds to Step S51 after the "combination detection processing" in Step S50 is completed.

During the processing in Step S51 of the flow chart shown in FIG. 6, the detection section 108 determines whether or not detection according to the methods of detection corresponding to all of the attributes identified in Step S42 as attributes associated with specifying the subject has been carried out (Step S51).

If the detection section 108 determines that there is an attribute among the attributes identified in Step S42 as attributes associated with specifying the subject for which detection by the corresponding method of detection has not been carried out (Step S51: No), processing returns to Step S43. The selection section 106 then selects the method of detection corresponding to the attribute for which detection by the corresponding method of detection has not been carried out.

When the detection section 108 finally determines that detection by the methods of detection corresponding to all of the attributes has been completed (Step S51: Yes), the detection section 108 ends object detection processing.

Returning to the flow chart in FIG. 5, after the object detection processing in Step S4 is completed, the detection apparatus 1 determines whether or not a subject was detected during object detection processing (Step S5).

If it is determined that a subject was not detected during the object detection processing in Step S4 (Step S5: No), the execution section 109 displays a focus frame encompassing a default focus object (Step S6), and processing proceeds to Step S7. Specifically, the execution section 109, in Step S6, displays a focus frame encompassing a facial image region when a facial image region was recognized during the object, color, and facial recognition processing in Step S1 of the flow chart shown in FIG. 5, and shows a focus frame encompassing the center of the target image TG acquired in Step S1 when a facial image region was not recognized.

If it is determined that a subject was detected during the object detection processing in Step S4 (Step S5: Yes), the execution section 109 sets the subject that was detected as the focus subject (Step S8) and displays a focus frame encompassing the subject (Step S9). Processing then proceeds to Step S7. If a plurality of subjects were detected during object detection processing, the execution section 109 sets the object OB positioned closest to the center of the live view image as the subject.

In Step S7, the CPU 21 determines whether or not the shutter button has been pushed (Step S7). If it is determined that the shutter button has not been pushed (Step S7: No), the CPU 21 continues to repeat Steps S3 to S9 until the cancel button has been pushed. In other words, the CPU 21 continues to receive input of words specifying the subject, and carries out processing to detect the subject using the input words.

If it is determined that the shutter button has been pushed (Step S7: Yes), the execution section 109 executes AF (autofocus) processing that focuses on the established focus subject (Step S10). The imaging section 110 then images the focus subject (Step S11), displays the generated image in the display section 31, and stores the generated image in the primary storage section 23. The imaging section 110 then ends image processing.

As explained above, a detection apparatus 1 according to the present embodiment detects from a target image TG a focus subject specified by words verbally input by a user, and then automatically focuses on the detected focus subject. The focus subject can easily be changed after an image has been taken or the self-timer has been activated, and the focus subject can be specified by verbal input at any time. As a result, the focus subject can be accurately and instantly specified even if there are a plurality of similar objects.

Modification Example

In the present embodiment, the detection apparatus 1 received an input of verbal words that specified a specific object. However, the words do not have to be verbally input, and can be input by any desired method, such as input using a keyboard.

In the present embodiment, the detection apparatus 1 acquired a captured image as a target image TG. However, the target image TG is not limited to just images captured by the detection apparatus 1, and may be an image that was previously imaged and stored by the detection apparatus 1 or an image acquired from an apparatus external to the detection apparatus 1.

In the present embodiment, the detection apparatus 1 displayed a focus frame encompassing a detected subject, and carried out AF (autofocus) processing that focused on the subject. However, a detection apparatus according to one aspect of the present invention can perform a desired form of processing other than AF processing on the subject. The detection apparatus 1 may perform AE (auto-exposure) processing that automatically adjusts exposure and AWB (auto white balance) processing that automatically adjusts white balance on the subject, for example.

In the above-mentioned embodiment, a detection apparatus and a method of detection according to one aspect of the present invention were explained using an example of an apparatus that included an imaging function. However, a detection apparatus and a method of detection according to one aspect of the present invention may be realized by an electronic device other than an apparatus that includes an imaging function, such as a camera. Examples of such an electronic device include a computer, a cellular phone, a digital camera, a PDA (personal digital assistant), or the like. In addition, the execution section 109 may perform a prescribed form of processing on the subject detected by the detection section 108 other than processing for imaging by the imaging section 110, such as AF, AE, and AWB processing. The execution section 109 may be configured so as to, in an electronic device that displays on a display screen an image that includes a plurality of subjects, change the position of a subject detected by the detection section 108 so that the subject is positioned at the center of the display screen and then display the image, for example. In this way, the apparatus can be made more user-friendly via the execution section 109 carrying out various forms of processing on the subject detected by the detection section 108.

Specifically, a detection apparatus according to one aspect of the present invention may be realized by: storing in a recordable medium (such as a memory card, a CD-ROM [compact disc read-only memory], or a DVD-ROM [digital versatile disc read-only memory]) that the above-mentioned electronic devices can read, programs for causing a computer, a cellular phone, a digital camera, a PDA, or the like to function as a detection apparatus according to one aspect of the present invention; and then distributing and installing the programs.

A detection apparatus according to one aspect of the present invention may also be realized by storing the above-mentioned programs in a storage apparatus (such as a disk apparatus, for example) included in a server apparatus on a communication network such as the internet, and then downloading those programs onto a computer, a cellular phone, a digital camera, a PDA, or the like.

In addition, when realizing the functions of a detection apparatus according to one aspect of the present invention via collaboration or distribution between an operating system (OS) and application programs, the application programs may only be stored on a recording medium or a storage apparatus.

In addition, the application programs may be superimposed upon a carrier wave and delivered via a communication network. The application programs may be posted on a bulletin board system on a communication network and then delivered via the network, for example. In addition, a detection apparatus according to one aspect of the present invention may be realized by: installing the application programs on a computer; running the programs; and, under the control of the OS, executing the programs in a similar manner to other application programs.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A detection apparatus for detecting a subject in a digital image, comprising:
    an input and output interface to which a word for identifying the subject is input; and
    a processor configured to:
    receive said word for identifying the subject from the input and output interface;
    determine an attribute that is specified by said word for identifying the subject, said attribute being at least one of name, color, shape, size, and position;
    select a method of detection in accordance with the determined attribute;
    apply the selected method of detection to the digital image to detect the subject in the digital image; and
    output a result of the detection of the subject so as to cause a prescribed action to be performed with respect to the detected subject in the digital image.

2. The detection apparatus according to claim 1, wherein the processor further determines a specific characteristic represented by said word.

3. The detection apparatus according to claim 1, wherein, to detect the subject in the digital image, the processor determines an object in the digital image that substantially matches a specific characteristic represented by said word as the subject that has been detected.

4. The detection apparatus according to claim 1,
    wherein the processor processes the digital image to find a plurality of candidates for the subject in the digital image, and
    wherein, to detect the subject in the digital image, the processor finds, among said plurality of candidates in the digital image, an object that substantially matches a specific characteristic represented by said word as the subject that has been detected.

5. The detection apparatus according to claim 4, further comprising a memory that stores names of objects and associated characteristic information used for detection of the objects in the digital image,
    wherein, when the processor determines that name is specified as the attribute by said word, the processor selects the method of detection that utilizes the characteristic information stored in the memory, and
    wherein, in finding the subject that substantially matches the specific characteristic represented by said word, the processor finds, among said plurality of candidates in the digital image, an object that substantially matches the characteristic information that is listed in the memory as being associated with the specified name.

6. The detection apparatus according to claim 5,
    wherein said memory stores, for each object name, specific values for a plurality of categories that have respectively been assigned priority levels as the associated characteristic information,
    wherein, when the processor determines that name is specified as the attribute by said word, the processor successively selects methods of detection, which are respectively associated with the plurality of categories, in order of said priority levels, and attempts to find, among said plurality of candidates in the digital image, a subject that substantially matches the specific value for the corresponding category until a match is found.

7. The detection apparatus according to claim 4, wherein, when the processor determines that color is specified as the attribute by said word, the processor selects the method of detection in accordance with color as the attribute specified by said word, and
    wherein the processor analyzes respective color distributions of said plurality of candidates and finds the subject that substantially matches the specified color.

8. The detection apparatus according to claim 4, wherein, when the processor determines that shape is specified as the attribute by said word, the processor selects the method of detection in accordance with shape as the attribute specified by said word, and
    wherein the processor analyzes respective contours of said plurality of candidates and finds the subject that substantially matches the specified shape.

9. The detection apparatus according to claim 4, wherein, when the processor determines that size is specified as the attribute by said word, the processor selects the method of detection in accordance with size as the attribute specified by said word, and
    wherein the processor compares respective areas of the plurality of candidates and finds the subject that substantially matches the specified size.

10. The detection apparatus according to claim 4, wherein, when the processor determines that horizontal position in the digital image is specified as the attribute by said word, the processor selects the method of detection in accordance with horizontal position as the attribute specified by said word, and
    wherein the processor compares respective horizontal positions of the plurality of candidates and finds the subject that is located at the specified horizontal position.

11. The detection apparatus according to claim 4, further comprising an imaging device including an optical lens and an image sensor,
    wherein the processor measures a distance to each of said plurality of candidates for the subject by controlling the imaging device,
    wherein when the processor determines that distance to the subject is specified as the attribute by said word, the processor selects the method of detection in accordance with distance to the subject as the attribute specified by said word, and wherein the processor compares respective distances to said plurality of candidates and finds the subject that is located at the specified distance.

12. The detection apparatus according to claim 1, wherein the processor is configured to:
receive one or more additional words for identifying the subject from the input and output interface;
determine an attribute that is specified by each of said one or more additional words;
select an additional method of detection in accordance with the attribute determined with respect to each of said one or more additional words; and
additionally apply the selected additional method of detection to the digital image in detecting the subject in the digital image.

13. The detection apparatus according to claim 1, wherein said input and output interface comprises:
a sound input device configured to receive a sound; and
a sound processor that recognizes and acquires the word for identifying the subject from the sound received by said sound input device.

14. The detection apparatus according to claim 1, further comprising a display that displays the digital image,
wherein the prescribed action is performed by the display by displaying a focus frame that encompasses the subject that has been detected in the digital images.

15. The detection apparatus according to claim 14, further comprising an image capturing section,
wherein the processor causes, as said prescribed action, one of autofocus, auto-exposure, and auto white balance processes that are prescribed for image capturing operations to be performed by said image capturing section.

16. A detection apparatus for detecting a subject in a digital image, comprising:
an input and output interface configured to receive a sound for identifying the subject; and
a processor connected to the input and output interface,
wherein one of the input and output interface and the processor converts the received sound into a word for identifying the subject,
and wherein said processor is further configured to:
extract a specific characteristic that specifies an attribute that is at least one of color, shape, size, and position from the word converted by said one of the input and output interface and the processor when the word includes the specific characteristic;
determine, from the digital image, the subject that has a characteristic that substantially matches the specific characteristic extracted from the word; and
output a result of the determination of the subject so as to cause a prescribed action to be performed with respect to the determined subject in the digital image.

17. A method of detecting a subject in a digital image performed by a processor in an apparatus that includes, in addition to said processor, an input and output interface to which a word for identifying the subject is input, the method comprising:
receiving the word for identifying the subject from said input and output interface;
determining an attribute that is specified by said word for identifying the subject, said attribute being at least one of name, color, shape, size, and position;
selecting a method of detection in accordance with the determined attribute;
applying the selected method of detection to the digital image to detect the subject in the digital image; and
outputting a result of the detection of the subject so as to cause a prescribed action to be performed with respect to the detected subject in the digital image.

18. A method for detecting a subject in a digital image, performed by an apparatus that includes a processor and an input and output interface, the input and output interface being configured to receive a sound for identifying the subject, the method comprising:
converting the received sound into a word for identifying the subject;
extracting a specific characteristic that specifies an attribute that is at least one of color, shape, size, and position from said word when the word includes the specific characteristic;
determining, from the digital image, the subject that has a characteristic that substantially matches the specific characteristic extracted from the word; and
outputting a result of the determination of the subject so as to cause a prescribed action to be performed with respect to the determined subject in the digital image.

19. A computer readable non-transitory storage medium having instructions stored therein, the instructions causing a processor in an apparatus that includes, in addition to said processor, an input and output interface to which a word for identifying a subject in a digital image is input to perform the following:
receiving the word for identifying the subject from said input and output interface;
determining an attribute that is specified by said word for identifying the subject, said attribute being at least one of name, color, shape, size, and position;
selecting a method of detection in accordance with the determined attribute;
applying the selected method of detection to the digital image to detect the subject in the digital image; and
outputting a result of the detection of the subject so as to cause a prescribed action to be performed with respect to the detected subject in the digital image.

20. A computer readable non-transitory storage medium having instructions stored therein for an apparatus that includes a processor and an input and output interface for detecting a subject in a digital image, the input and output interface being configured to receive a sound for identifying the subject, the instructions causing the apparatus to perform the following:
converting the received sound into a word for identifying the subject;
extracting a specific characteristic that specifies an attribute that is at least one of color, shape, size, and position from said word when the word includes the specific characteristic;
determining, from the digital image, the subject that has a characteristic that substantially matches the specific characteristic extracted from the word; and
outputting a result of the determination of the subject so as to cause a prescribed action to be performed with respect to the determined subject in the digital image.

21. The detection apparatus according to claim 1, wherein the processor determines said attribute that is specified by said word by selecting one of a plurality of attributes that are prescribed for identifying the subject.

22. The detection apparatus according to claim 1, wherein the processor determines said attribute that is specified by said word with reference to information obtained from the digital image, thereby possibly selecting different attributes for a same single word that specify said attribute, depending on the information obtained from the digital image.

23. The detection apparatus according to claim 1, further comprising a display device,
wherein the processor receives said word for identifying the subject from the input and output interface when the display device does not display any indication for identifying the subject.

24. The detection apparatus according to claim 1, wherein, when the attribute determined by the processor specifies a relative relationship among a plurality of objects in the digital image, the processor selects the method of detection that is based on the specified relative relationship, and
wherein the processor detects said subject in the digital image by comparing the plurality of objects in the digital image using the selected method of detection.

25. The detection apparatus according to claim 4, wherein, when the attribute determined by the processor specifies a relative positional relationship among the plurality of candidates in the digital image, the processor selects the method of detection that is based on the specified relative positional relationship, and
wherein the processor finds, among the plurality of candidates in the digital image, the object that meets the specified relative positional relationship so as to detect the subject in the digital image.

* * * * *